(12) United States Patent
Melen (10) Patent No.: US 6,437,306 B1
(45) Date of Patent: Aug. 20, 2002

(54) REDUCING MOTION ARTIFACTS BY JOINING PARTIAL IMAGES IN MULTIPLE SCANS

(75) Inventor: Roger D. Melen, Los Altos Hills, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/431,000

(22) Filed: Nov. 1, 1999

(51) Int. Cl.[7] .......................... H01L 27/00; G01B 15/02
(52) U.S. Cl. .................. 250/208.1; 378/146; 345/506
(58) Field of Search ..................... 250/208.1; 378/54, 378/98.12, 146; 345/202, 507–509, 512; 348/625, 630, 631

(56) References Cited

U.S. PATENT DOCUMENTS 6,081,582 A * 6/2000 Mazess et al. .............. 378/146
6,157,396 A * 12/2000 Margulis et al. ............ 345/506

OTHER PUBLICATIONS

Tatsuya Yamazaki, et al., "Development of Digital Radiography System," *Proceedings of the 12th International Symposium and Exhibition,* Tokyo, Jun. 24–27, 1998, pp. 535–540.

Toshio Kameshima, et al., "Novel Large Area MIS–type X–ray Sensor for Digital Radiography" *Part of the SPIE Conference on Physics of Medical Imaging,* San Diego, California, Feb. 1988, pp. 453–462.

* cited by examiner

*Primary Examiner*—Stephone Allen
(74) *Attorney, Agent, or Firm*—Fitzpatrick, Cella, Harper & Scinto (57) ABSTRACT

In generation of combined image data from first and second scans of an image, artifacts caused by motion between the first and second scans are reduced. Digital pixel data for the first and second scans are stored. A translational second scan is generated using the first and second scans, the translational second scan having new digital pixel data which compensates for motion artifacts between the first and second scans. The combined image data is generated by combining the digital pixel data of the first scan with the new digital pixel data of the translational second scan, with the translational second scan being weighted before it is summed with the digital pixel data of the first scan.

38 Claims, 6 Drawing Sheets

REDUCING MOTION ARTIFACTS BY JOINING PARTIAL IMAGES IN MULTIPLE SCANS

FIELD OF THE INVENTION

This invention relates to the field of digital imaging. More specifically, the invention relates to a method for reducing motion artifacts in digital imaging.

BACKGROUND OF THE INVENTION

Cameras have historically recorded image data on film using digital control systems for focus, exposure, film advance and other functions. Recently, digital cameras have been developed which record digital imaging information on storage media such as flash memory cards.

Figures 1A, 1B:
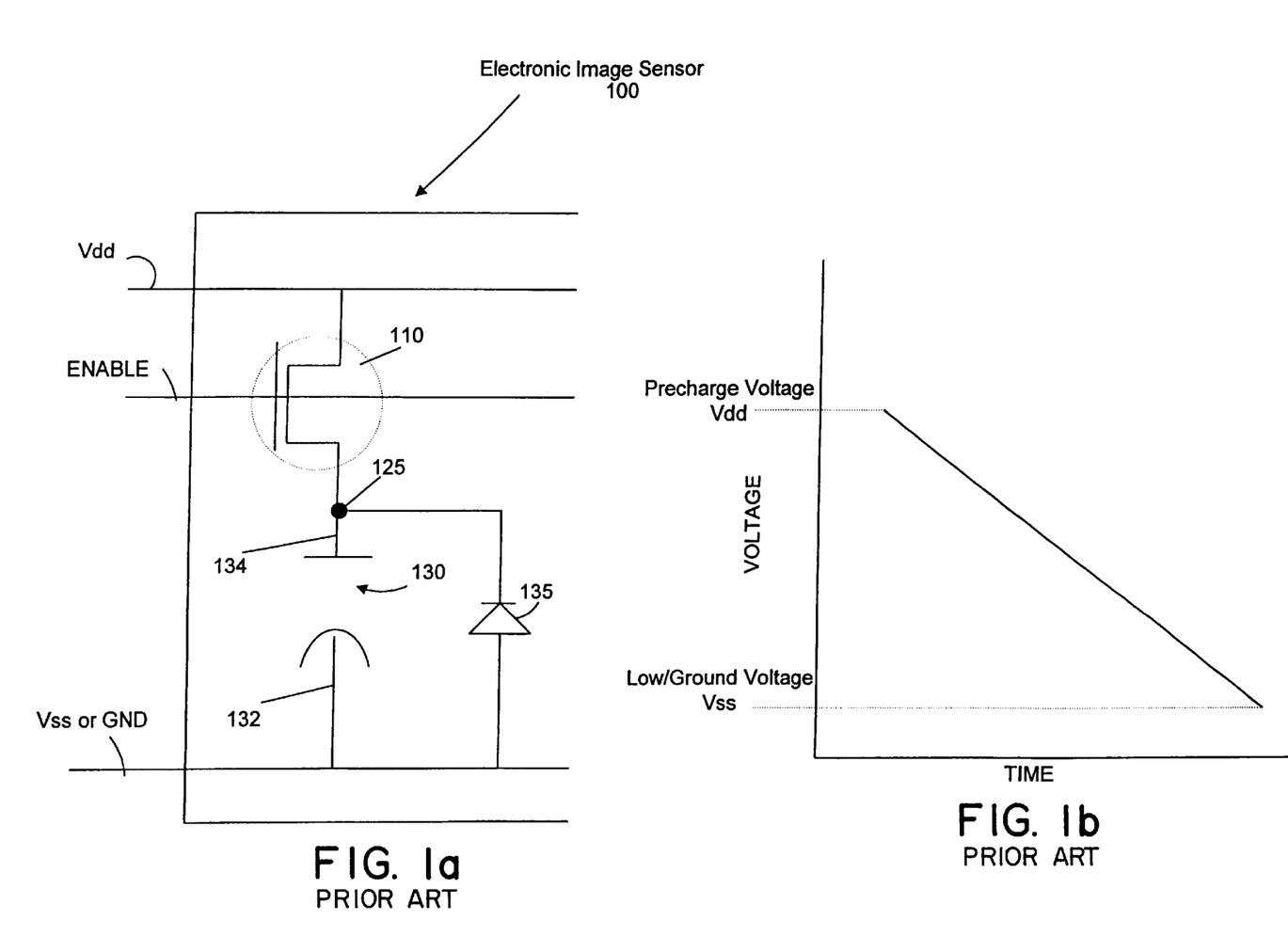
FIG. 1a illustrates a digital image capture cell for capturing digital pixel information for a single pixel in a row of pixels in a digital image.
FIG. 1b illustrates an ideal constant voltage drop in the storage capacities of an electronic image sensor.

In digital cameras, electronic image sensors are used to capture digital pixel data, where each image is comprised of a plurality of pixels and each pixel is represented by digital pixel information captured by one of the electronic image sensors. These electronic image sensors are typically arranged in a matrix of rows and columns, with each sensor capturing digital pixel information for one pixel in the matrix. FIG. 1a illustrates a single typical electronic image sensor 100. As shown, the electronic image sensor includes an NMOS transistor 110 having a drain coupled to a high voltage rail Vdd, a gate coupled to an ENABLE signal, and a source coupled to a node 125. A storage capacitor 130 is also included in the electronic image sensor 100, the capacitor 130 having a first terminal 132 coupled to a ground voltage Vss and a second terminal 134 coupled to the node 125. When the ENABLE signal is active, the NMOS transistor 110 is turned on and the storage capacitor is charged by the high voltage rail Vdd. This occurs during a pre-charge phase. Finally, the electronic image sensor 100 includes a photo sensitive diode 135 having a cathode coupled to the node 125 and an anode coupled to the ground voltage Vss.

In operation, the storage capacitor 130 is precharged to a predetermined voltage level by the high voltage rail Vdd whenever the ENABLE signal is active. This is the pre-charge phase. Accordingly, an ENABLE signal is transmitted to all the electronic image sensors 100 in an image array, in order to precharge all the sensors before any digital pixel information is to be captured and stored. After all the sensors have been precharged and the pre-charge phase is complete, the ENABLE signal is disabled and the NMOS transistor 110 in each sensor is turned off. At this point, the capacitor 130 in each image sensor remains fully charged and the image array is ready to capture digital pixel information for an image.

Thereafter, when an image is to be captured, a shutter on the digital camera quickly opens and shuts, thereby allowing a small amount of light to reach the electronic image sensors 100 in the image array. As light hits the photo sensitive diode 135, the predetermined voltage level which is stored on the storage capacitor 130 begins to drop as current is discharged through the photo sensitive diode 135 toward the ground voltage Vss. Assuming a constant intensity light source directed at the electronic image sensor 100 over a period of time T during which the shutter on the digital camera is open, the storage capacitor 130 will preferably discharge in a linear fashion during the time the shutter on the digital camera is open. Accordingly, if the voltage on the storage capacitor 130 is measured and recorded at several intervals over the time T, a straight line pattern should be observable. This is illustrated in FIG. 1b.

Typically, photo sensors used in digital image capturing technology have always been single read/erase—i.e. such cells can only be scanned with image data a single time and read once such that they must be automatically restored to their predetermined precharge voltage (typically 5 Volts) after the cell voltage is read before the next image can be captured. However, designers are now developing non-destructive photo sensing image capture cells in which multiple scans of an image may quickly captured before the cell needs to be restored to its precharged condition. This enables for the quick scanning of an image over a very short period of time while prolonging the life of the photo sensing image capture cells since they do need to be recharged after every read. Preferably, the scans are done at select intervals over a time period $T_{dis}$, wherein the time period $T_{dis}$ is equal to the total amount of time it would take for the capacitor in a photo sensing image capture cell to completely discharge to reference or ground voltage Vss.

The voltages on these non-destructive photo sensing image capture cells are measured and recorded relative to the precharged voltage at several select intervals—e.g. the cell voltage may be measured at 1 ms, 2 ms, 4 ms and 8 ms. As explained earlier, assuming a constant intensity light source directed at the photo sensing image capture cell over the period of time $T_{dis}$, during which the shutter on the digital camera is open, the capacitor in the cell will preferably discharge in a linear fashion. Accordingly, if the capacitor voltage is measured and recorded at several intervals over the time period $T_{dis}$, a straight line pattern should be observable.

However, if there is a change in the light intensity applied to the sensors in the image array, which is typically caused by small movements in the image or the camera, then over time the scanned image will not be the same—i.e., the voltage on the capacitor will not discharge in a linear fashion. This phenomenon is known as motion artifact.

With these new digital cameras having multiple scan capability, the multiple scans of the same image are preferably performed at a preferred rate of XXXXXXX PREFERRED RATE HERE. The multiple scans are then combined in order to produce a single clear image. Unfortunately, there is no known way for compensating for motion artifact between the multiple scans. Accordingly, if the camera or image moves between subsequent scans, while the shutter on the digital camera is open, then the combined image will be unclear, foggy and blurred.

Accordingly, what is needed is a method for compensating for motion artifact which may occur between multiple images scans such that the scans may be combined in order to form one clear final image.

SUMMARY OF THE INVENTION

The invention is a process for reducing motion artifacts in digital images which are created from multiple scans using a digital camera. More specifically, the invention is a process for creating a single digital image from multiple scanned images which are scanned over a period time, and therein reducing the effects of motion artifact which may occur between each of the multiple scans by joining fractions of each scanned image using scaling and translation techniques.

In one embodiment of the invention, an image to be captured is scanned several times over a period of time T using a digital camera, with the integration times for each scan increasing by a scalable factor. In a preferred embodiment this scalable factor is a factor of two, such that the image may be scanned at 1 ms, 2 ms, 4 ms and 8 ms from an initial zero time starting point. Using a digital camera, digital pixel data from each of the scans is captured and read from an array of image capture cells. The digital pixel data scans are then combined using scaling and translation techniques designed to reduce the effects of motion artifacts between each of the subsequent scans.

Original scan data or digital pixel data from a plurality of scanned images are each translated into new scan data or new digital pixel data in order to compensate for any motion artifacts which may have occurred between each of the scanned images. In order to translate the original digital pixel data into new digital pixel data, each scanned image is broken down into a number of sections and the centroid or center of intensity for each section in the scanned image is calculated. Translation vectors are then calculated between each subsequently scanned image and a first or best scanned image, wherein the translation vectors account for differences in the position of the centroid or center of intensity between each of the corresponding sections in the subsequently scanned images and the first or best scanned image. Any anomalies in the translation vectors indicating severe motion or extreme alterations in the scanning environment between each subsequent scan are then detected and the appropriate scanned image which caused such anomaly is then disregarded. After any anomalies have been deleted and the appropriate image disregarded, each pixel in the subsequent scans is then adjusted in position using the translations vectors which were calculated between the first or "best" scanned image and each subsequently scanned image.

Before translation vectors are calculated, revised scan data or digital pixel data is calculated for each of the plurality of scanned images, wherein said revised scan data or digital pixel data represents changes in scan voltages at each of the pixel locations between subsequent scans. Motion artifacts can then be more effectively removed between each of the scanned images, thereby creating the new scan data for each image. Revised scan data or digital pixel data is calculated by subtracting out voltage levels from the prior scan data for each pixel location from the current scan data. In this way, changes in voltage levels attributable to prior scans are not carried over into each subsequent scan. The revised scan data is then used to generate the new scan data and translational vectors. Using the revised scan data or digital pixel data, each scan is then divided into a number of sections. Centroids or centers of intensity for each of these sections are calculated and translation vectors are generated representing differences in centroid or center of intensity locations for each section between subsequent scans and a first or best scan are then calculated. Any anomalies in the translation vectors indicating severe motion or extreme alterations in the scanning environment between each subsequent scan are then detected and the appropriate scanned image which caused such anomaly is then disregarded. The pixels in each subsequently scanned image are then adjusted using the translation vectors.

Finally, each of the scanned images is scaled by a weighting factor to account for small voltage drops attributable to the lapse of time between scans. Then, all of the new scan data or digital pixel data from each of the scanned images is combined in order to form one single image.

In a preferred embodiment, the invention is implemented in a software program stored in a memory. The software program causes a processor to perform the various steps for reducing motion artifacts between scanned images, wherein the software causes the processor to store digital pixel data from each of the scanned images in a storage device, reduce any motion artifacts which may have occurred between each of the multiple scans, and combine digital pixel data from each of the scanned images in order to generate a final image. Preferably, the software program includes a digital pixel data storage module, a digital pixel data adjustment module, a translational vector generation module and a summing module.

In a preferred embodiment, the digital pixel data adjustment module causes the processor to subtract out digital pixel data from the previous scan for each subsequent scan. Accordingly, in a preferred embodiment where four scans are captured, weighted data from the first scan will be subtracted from the second scan, weighted data from the second scan will be subtracted from the third scan, and weighted data from the third scan will be subtracted from the fourth scan. The data is weighted to compensate for the lapse of time between each scan. In an alternative embodiment the actual voltages may be subtracted from each other and weighting may be performed at the end of the entire process by the summing module when the scanned images are combined.

In a preferred embodiment, the translational vector generation module causes a processor to calculate translational vectors between each subsequent scan and a first or best scan, where the translational vector will be used to reposition scanned data of later scans to correspond with location of the same data in a prior or "best" scan. Each scanned image is divided into an equal number of sections and centroids or centers of intensity for each section are calculated. Alternatively, an overall centroid or center of intensity may be calculated for each image in its entirety. Once centroids have been calculated, translational vectors are calculated by determining an integer number of horizontal and vertical pixel locations between the centroids of the first or "best" image and the centroids for each of the other scanned images. This is done for each sector in the subsequently scanned images. The translational vector generation module further causes the processor to adjust the data in each of the subsequent scans by using the translational vectors to adjust each pixel location by an integral number of pixel locations which correspond with the translational vector. Accordingly, new digital pixel data is generated for each of the subsequently scanned images.

Finally, the summing module will cause the processor to combined all of the scanned images. The summing schedule may use weighted summing techniques in order to generate a complete final image or may simply add the new digital pixel data information for each of the subsequent scans with the information from the first or best scanned image in order to generate a final image.

BRIEF DESCRIPTION OF THE DRAWINGS

The present invention has advantages and features which will be more readily apparent from the following detailed description of the invention and the appended claims, when taken in conjunction with the accompanying drawings, in which:

DETAILED DESCRIPTION OF THE PREFERRED EMBODIMENTS

The present invention is a method, apparatus and computer readable medium for reducing motion artifacts which may occur between multiple scans which are captured in a single exposure cycle. The method or process may be implemented through software, firmware and/or hardware having any number of modules which cause a processor to perform the various steps of the process or method.

Preferably, a single exposure cycle begins with precharging each digital image capture cell in a photo sensing array to a predefined state by charging the capacitors within the cells to a reference voltage level. After all capacitors have been charged, the sensor array is exposed to light in order to rapidly capture multiple scanned images. In a preferred embodiment, the sensor array is rapidly scanned four times at preselected intervals that are preferably a factor of two greater than the previous scan time—e.g., 1 ms, 2 ms, 4 ms, and 8 ms, in order to capture from separate scanned images.

In the present invention, the ultimate goal or objective is to be able to effectively combine each of the four separately scanned images in order to generate one single image and, in doing so, to be able to filter out any motion artifacts which exist between the four different images. Motion artifacts are changes between the scanned image caused by the movement of the image or the movement of the image capturing device—i.e., the digital camera used to scan the image. Motion artifacts also include changes in the scanned image caused by a change in the position or intensity of the light source. Each of the scanned images is adjusted in accordance with the present invention in order to remove any motion artifacts which may have occurred between each of the multiple scans. The digital pixel image data from each of the images is then weighted and summed in order to generate one single image.

Figure 2:
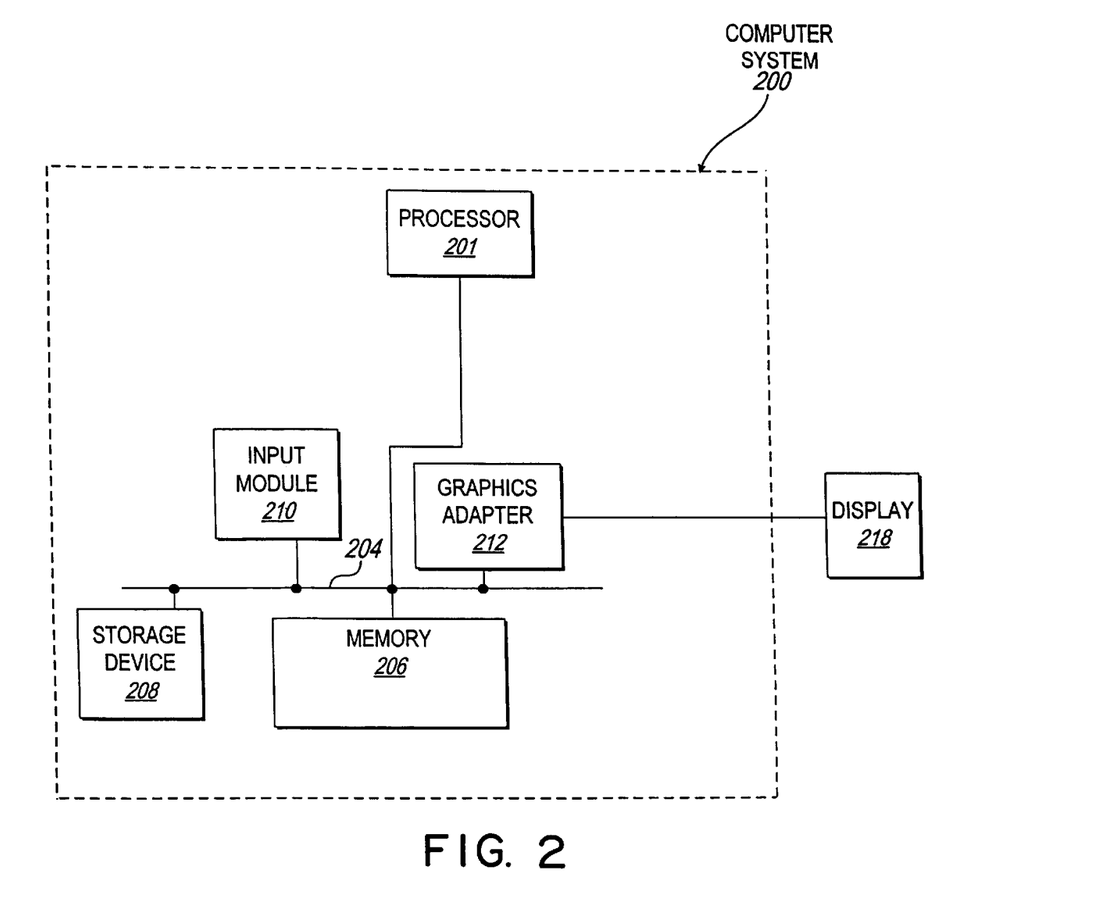
FIG. 2 is a high level block diagram of a computer system for executing a process for reducing motion artifacts by joining partial images according to the present invention.

FIG. 2 is a high-level block diagram of a computer system 200 for executing a process for reducing motion artifacts by joining partial images according to the present invention. FIG. 2 illustrates at least one processor 201 coupled to a bus 204. Also coupled to the bus 204 are a memory 206, a storage device 208, an input module 210, and a graphics adapter 212. An active matrix display 218 is preferably coupled to the graphics adapter 212. The at least one processor 201 may be any general-purpose processor such as an INTEL PENTIUM PROCESSOR, SUN MICROSYSTEMS SPARC, or POWERPC compatible-CPU. The storage device 208 may be any device capable of holding data, like a hard drive, compact disk read-only memory (CD-ROM), DVD, or a solid-state memory device. The memory 206 preferably holds executable instructions and data used by the processor 201 for implementing and executing the process of reducing motion artifacts by joining partial images according to the present invention.

Preferably, program modules stored within the memory 206 provide the functionality for implementing and executing the process of reducing motion artifacts by joining partial images according to the present invention. The program modules are executed by the processor 201. Alternatively, hardware or software modules for reducing motion artifacts by joining partial images according to the present invention may be stored elsewhere within the computer system 200 and executed by the processor 201.

Figure 3:
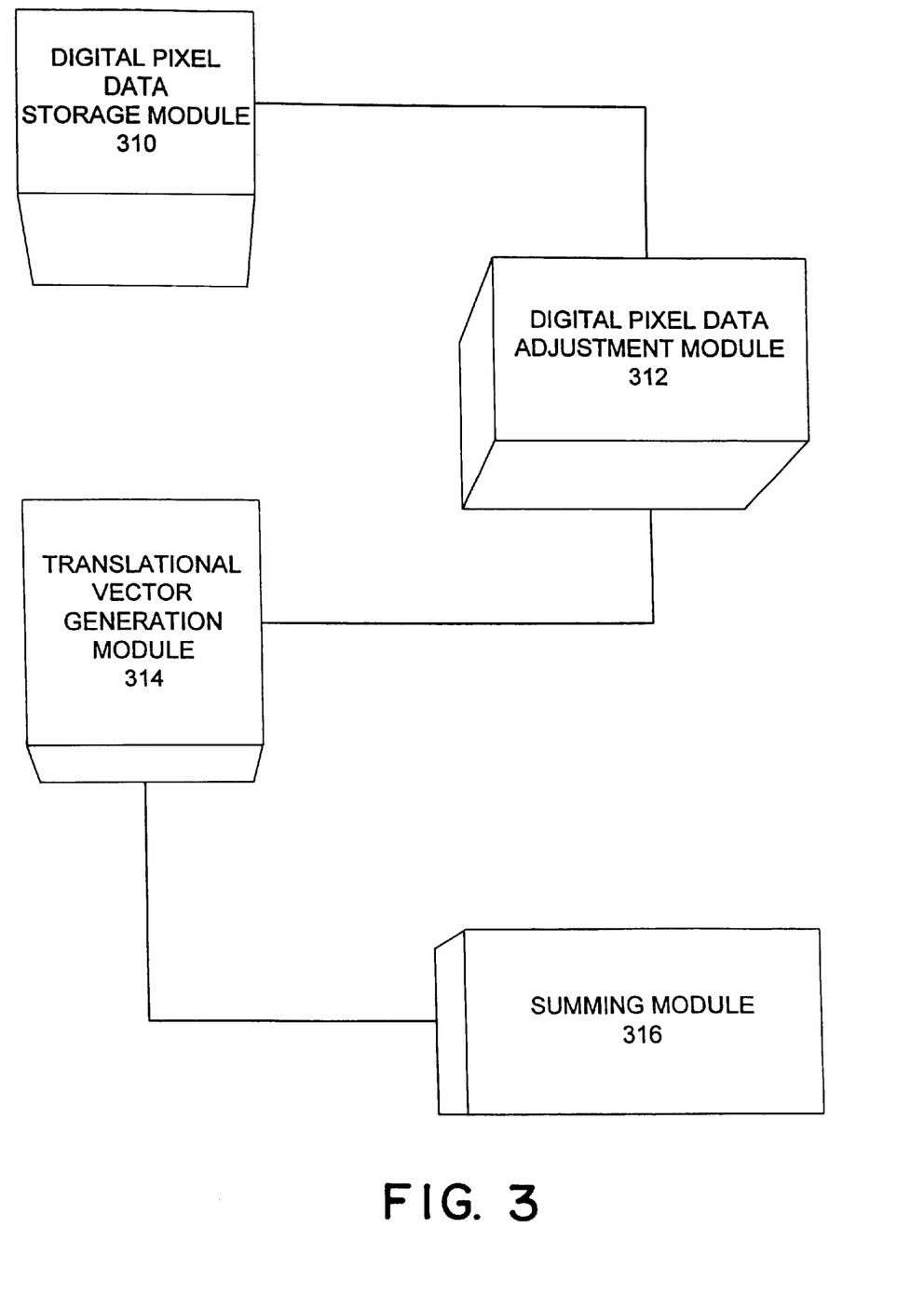
FIG. 3 illustrates a block diagram showing all of the software modules for reducing motion artifacts by joining partial images according to a preferred embodiment of the present invention.

FIG. 3 illustrates a block diagram showing all of the software modules for reducing motion artifacts by joining partial images according to a preferred embodiment of the present invention. The software modules include a digital pixel data storage module 310, a digital pixel data adjustment module 312, a translational vector generation module 314, and a summing module 316.

The digital pixel data storage module 310 retrieves original scan data or digital pixel data for each of a multiple of scanned images from a flash memory card of a digital camera and stores this data in the storage device 208. In a preferred embodiment, there are at least four scans in a single exposure cycle and so the digital pixel data storage module 310 will retrieve and store original pixel data for each of those four scans. The digital pixel data adjustment module 312 adjusts this scan data or digital pixel data in order to subtract out data from previously scanned images in order to generate revised scan data or revised digital pixel data for each of the scanned images which represents voltages changes at each pixel location attributable only to the scan of that image. The translational vector generation module 314 calculates translational vectors between each of the subsequently scanned images and a first or best scanned image.

A translational vector represents an integral number of horizontal and vertical pixel locations between centroids or centers of intensity of each subsequently scanned image and a first or best scanned image. The translation vector generation module 314 will then relocate or realign each of the pixels in the subsequently scanned images by the integral number of pixel locations using the translation vector calculated for that image. Finally, the summing module 316 will combine the new digital pixel data for each of the subsequently scanned images with the digital pixel data from the first or best scanned image in order to generate a final image. The summing module 316 may directly add the voltages from each scanned image or may use weighted summing techniques.

Figure 4:
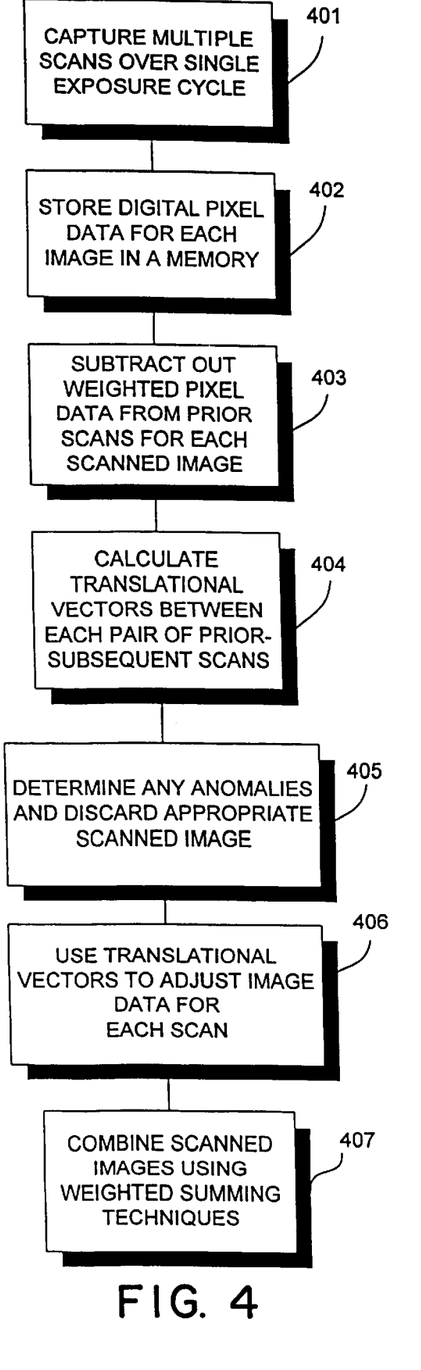
FIG. 4 is a flowchart illustrating the steps involved in a preferred embodiment of the present invention for reducing motion artifacts by joining partial images in multiple scans.

FIG. 4 illustrates a flowchart showing each of the preferred steps for capturing multiple scans in a single exposure cycle, reducing motion artifacts between each of the multiple scans in accordance with the present invention, and combining the multiple scans in order to generate a single image. It is understood that the step of capturing multiple scanned images over a single exposure cycle (Step 401) is performed using a digital camera having an erasable flash memory card for capturing digital pixel data of an image. Additionally, each of the other steps in the flowchart are preferably performed by separate software modules stored within a memory device and executed by a processor.

As shown in the flow chart of FIG. 4, the first step 401 in the process is to capture multiple scans over a single exposure cycle. This may be accomplished using a digital camera having an erasable flash memory card capable of capturing and storing digital pixel data for multiple image scans over a single exposure cycle. An exposure cycle begins with precharging each digital image capture cell in a photo sensing array to a predefined state by charging the capacitors within the cells to a reference voltage level. After all capacitors for all of the digital image capture cells in the photo sensing array have been charged, the photo sensing array is exposed to light in order to rapidly capture digital images. In a preferred embodiment, the photo sensing array is rapidly scanned four times at preselected intervals that are preferably a factor of two greater than the previous scan time—e.g., 1 ms, 2 ms, 4 ms, and 8 ms.

The digital pixel data for each of these scans is then downloaded to a computer system for further processing (much like the system in FIG. 2) and stored in a memory or storage device (Step 402). In a preferred embodiment, the digital pixel data is stored as a voltage level for each pixel location in the image, where the voltage level is recorded as a voltage drop from the predefined or precharged reference voltage. Accordingly, in a preferred embodiment, as each scan is captured, the voltage level at each cell location is read and compared to the reference voltage the cell started at the beginning of the exposure cycle, and the difference or drop in voltage is recorded.

Once all of the digital pixel data for each of the scans has been captured, downloaded to a computer system and stored in a storage device of the computer systems, the present invention reduces any motion artifacts which may have occurred between each of the multiple scans. Preferably, a processor in the computer system calls a software program from memory and begins to execute each of the steps necessary to reduce motion artifacts which may have occurred between each of the scanned images. The first step in reducing the motion artifacts is to preferably subtract out weighted digital pixel data from the previous scan for each subsequent scan (Step 403). Accordingly, in a preferred embodiment where four scans are captured, weighted data from the first scan will be subtracted from the second scan, weighted data from the second scan will be subtracted from the third scan, and weighted data from the third scan will be subtracted from the fourth scan.

The data from each previous scan is preferably weighted in order to compensate for the delay time between each scan. The process of subtracting out weighted data from previous scans is discussed in further detail later herein. However, it is understood that as described earlier in a preferred embodiment as each scan is captured it reflects a change in voltage from the purchased or predetermined voltage level. This step is needed in order to subtract out that portion of the change in voltage which is attributable to the prior scans. Preferably, this step is performed by the digital pixel data adjustment module 312 of the software program.

After weighted data is subtracted out from each subsequent scan, the next step in the process for reducing motion artifacts is to calculate translational vectors between each subsequent scan and a first or "best" scan (Step 404). The translational vector will be used to reposition scanned data of later scans to correspond with location of the same data in the prior or "best" scan. It is understood that the prior or "best" scan is usually the first scan and all other scans are adjusted in accordance with this first or "best" scan. Accordingly, in a preferred embodiment where four scans are captured, a first translational vector is calculated between the first or "best" scan and the second scan, a second translational vector is calculated between the first or "best" scan and the third scan, and a third translational vector is calculated between the first or "best" scan and the fourth scan. The process of calculating translational vectors between each pair of first or best scan and subsequent scan includes several substeps. These substeps are shown in the subflowchart of FIG. 4a.

Figure 4A:
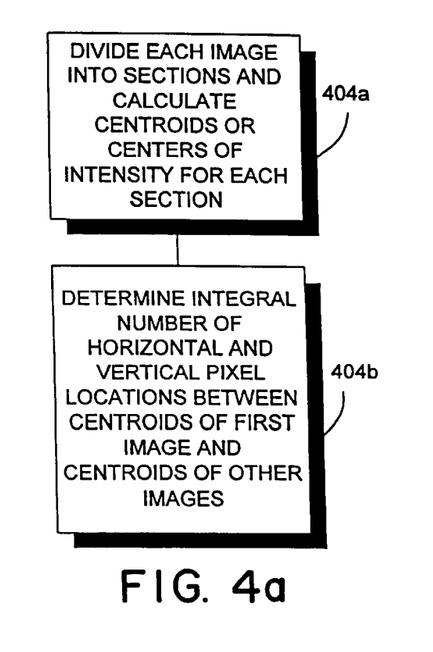
FIG. 4a is a flowchart showing the substeps involved in the process of calculating translational vectors.

As show in the subflowchart of FIG. 4a, the first substep in calculating translational vectors for each scanned image is to calculate centroids or centers of intensity for each of the scanned images. In a preferred embodiment, each scanned image is divided into an equal number of sections and centroids or centers of intensity for each section are calculated 404a. Alternatively, an overall centroid or center of intensity may be calculated for each image in its entirety. Once centroids have been calculated, translational vectors are calculated by determining an integral number of horizontal and vertical pixel locations between the centroids of the first or "best" image and the centroids for each of the other scanned images 404b. This is done for each section in the other scanned images. It is assumed the first image will be the best image (i.e., the image with the least motion artifacts) and all other subsequent scans are adjusted in accordance with the centroids for that image. Although, in some instances this may not always be the case. Accordingly, a visual assessment may be made of all images after they are all scanned in order to determine which image is the "best" image.

Thereafter, in the preferred embodiment in which four scans are taken, there are three sets of translational vectors. A first set of translational vectors shows the differences between the first or best image and the second image, a second set of translational vectors shows the differences between the first or best image and the third image, a third set of translational vectors shows the differences between the first or best image and the fourth image.

Returning to the main flowchart of FIG. 4a, the fourth step in the process of the present invention is to determine whether the translational vectors are too large (Step 405). Preferably, any system utilizing the present invention has a limitation on the degree on motion artifacts which may be compensated for in any given image. If the translational vectors are too large, the system will not be able to filly compensate for motion artifacts and, instead, the particular scan will be discarded and will not be used in generating the final image. Preferably, an upper limiting vector is predetermined and reflects the maximum distance or motion artifact which may be compensated for in the system. For example, if the object or the camera has moved too much, the system may not be able to fully compensate for such motion artifact and the system will not use that particular scan. Preferably, the translational vectors calculated are compared to the upper limiting vector. If the translational vector is larger than the upper limiting vector, than the subsequent scan which yielded that translational vector is disregarded (Step 405). This is repeated for all translational vectors calculated between each pair of first or best scan and subsequent scan.

The fifth step in the process is to adjust the data in each of the remaining subsequent scans by using the translational vectors to adjust each pixel location in the subsequent scan by an integral number of pixel locations which correspond with the translational vector (Step 406). In short, data for each pixel location in the second scanned image will be adjusted to correspond with a new pixel location using the translational vector calculated between the first or "best"

scanned image and the second scanned image, thereby generating a new second image. Likewise, data for each pixel location in the third scanned image will be adjusted to correspond with a new pixel location using the translational vector calculated between the first or "best" image and the third scanned image, thereby generating a new third image; and data for each pixel location in the fourth scanned image will be adjusted to correspond with a new pixel location using the translational vector calculated between the first or "best" image and the fourth scan, thereby generating a new fourth image. The process of generating these new second, third and fourth images using the translational vectors is discussed in further detail later herein.

Finally, after new second, third and fourth images have been generated, they are combined with the first or "best" scanned image (the image which has not been adjusted) in order to generate a complete final image (Step 407). Preferably this step is performed by the summing module 316. The summing module 316 may simply add the new digital pixel data directly or may utilize weighted summing techniques in order to generate the complete final image.

Subtracting Out Weighted Data From Previous Scans

As explained earlier, the third step in the process of removing motion artifacts between subsequent scans is to subtract out weighted data from each previous scan (Step 403). This step will result in the creation of revised digital pixel data for each of the scanned images. This is preferably performed by the processor when executing the digital pixel data adjustment module 312.

Figure 5:
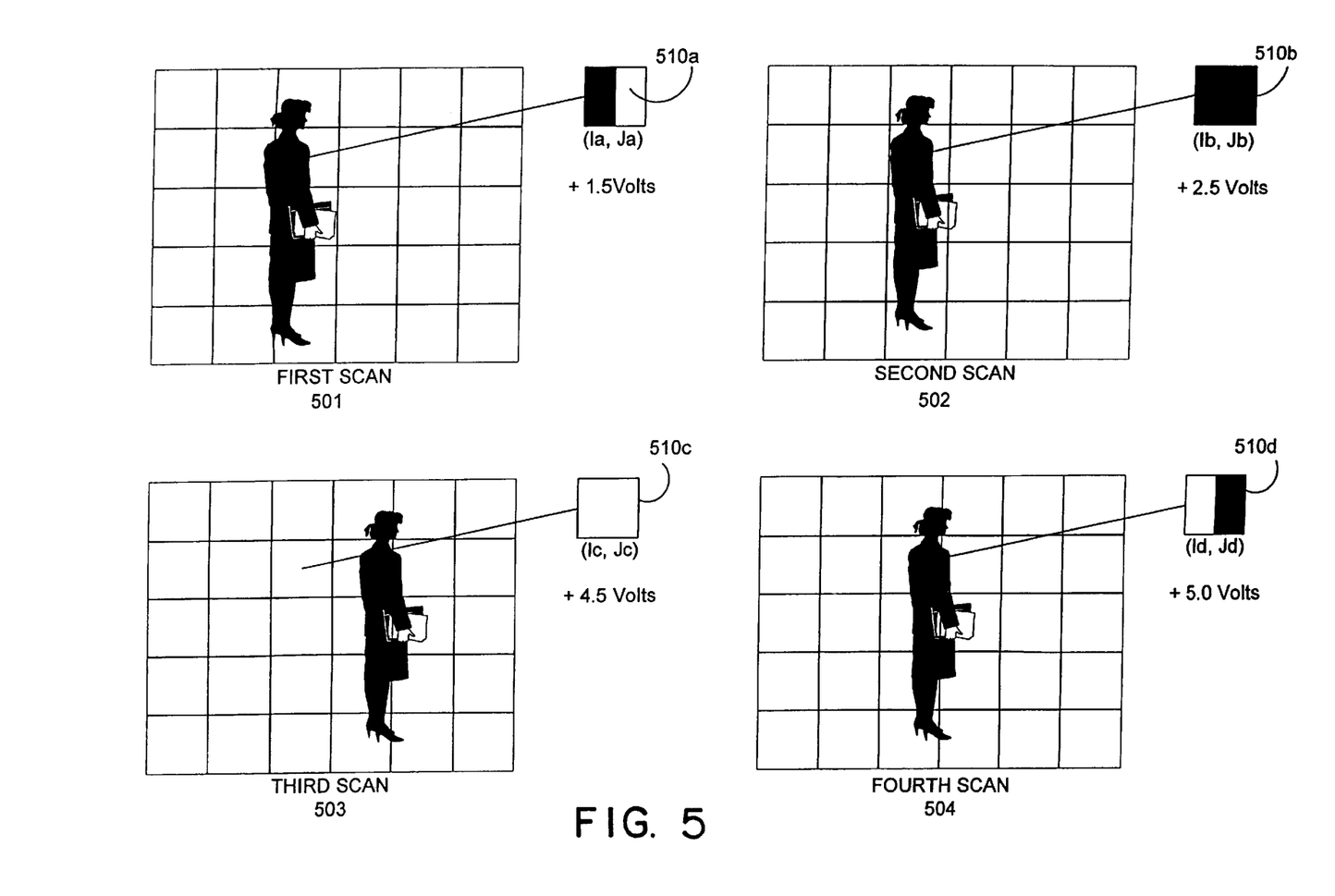
FIG. 5 illustrates the concept of subtracting out prior digital image pixel data from subsequent scans in order to generate revised digital pixel data in accordance with a preferred embodiment of the present invention.

FIG. 5 illustrates four scanned images 501–504 which were taken over a single exposure cycle. In accordance with the present invention, the second image 502 will be adjusted to accommodate for any residual motion artifact which may have occurred between the first scanned image 501 and the second scanned image 502 by subtracting out the digital data of the first image from the second image. Likewise, the third image 503 will be adjusted to accommodate for any residual motion artifact which may have occurred between the third scanned image 503 and the image in the second scan 502 by subtracting out the digital data of the second image 502 from the digital data of the third image 503. Finally, the fourth image 504 is adjusted to accommodate for any residual motion artifact which may have occurred between the fourth scanned image 504 and the image in the third scan 503. The process of subtracting out weighted data from each previous scan is done by taking the original digital pixel information for each pixel location in an image and subtracting out the digital pixel information for each pixel in the same location in the previous image.

FIG. 5 illustrates this procedure for removing residual motion artifacts between images in order to create revised digital pixel data for each of the scanned images. As explained earlier, each pixel in an image is represented by a change in voltage level on a capacitor in the image capture cell at the time the image was scanned. In a digital camera having multiple scan capability, each scanned image will reflect a change in voltage level for the capacitor from an initial or precharged voltage level. However, since the voltage level on the capacitor is not recharged between each subsequent scan, the voltage level on a capacitor in an image capture cell is effected by the prior scan and each subsequent scanned image contains voltage change information from the previous scan. Accordingly, there is a need to filter out this information so that each scanned image only contains information attributable to the currently scanned image.

FIG. 5 shows the original scanned pixel data for four different scans of a single object. It is assumed that the first image 501 was scanned at a time $T_{scan}$, the second image 502 was scanned at short interval in time thereafter ($T_{scan}$+$\Delta T_1$), the third image 503 was scanned a short interval of time thereafter ($T_{scan}$+$\Delta T_1$+$\Delta T_2$), and the fourth image 504 was scanned a short interval of time thereafter (($T_{scan}$+$\Delta T_1$+$\Delta T_2$+$\Delta T_3$). As explained earlier, in a preferred embodiment, the photo sensing array is rapidly scanned four times at intervals that are a factor of two greater than the previous scan. Accordingly, in a preferred embodiment, $T_{scan}$=1 ms, $T_{scan}$+$\Delta T_1$=2 ms, $T_{scan}$+$\Delta T_1$+$\Delta T_2$=4 ms, and $T_{scan}$+$\Delta T_1$+$\Delta T_2$+$\Delta T_3$=8 ms.

As shown in FIG. 5, each image is divided into a matrix of pixel locations which are arranged in columns and rows. FIG. 5 shows enlarged pixel locations 510a, 510b, 510c and 510d from each of the first, second, third and fourth scanned images 501–504. Each pixel location in each of the scanned images is assigned a voltage level which determines the color/brightness of the pixel in the image. This voltage level represents a change in the voltage level measured at the image capture cell when that image was captured relative to some reference or precharged voltage level. Accordingly, pixel location ($I_a$, $J_a$) in the first image 501 has a voltage level of +1.5 Volts (representing a drop of +1.5 volts from the reference or precharge voltage level), while the same pixel location ($I_b$, $J_b$), (where $I_a$=$I_b$ and $J_a$=$J_b$), in the second image 502 has a voltage level of +2.5 Volts (representing a drop of +2.5 volts from the same reference or precharge voltage level) and the same pixel location ($I_c$, $J_c$) (where $I_c$=$I_b$=$I_a$ and $J_c$=$J_b$=$J_a$), in the third image 503 has a voltage level of +4.5V (representing a drop of +4.5V reference or precharge voltage level).

However, the voltage level assigned to pixel location ($I_b$, $J_b$) in the second image 502 would, by necessity, already include the voltage drop attributable to the prior scan taken in the first image 501, since the capacitor in the image capture cell was not recharged between scanning of the first image 501 and the scanning of the second image 502. Additionally, the voltage level assigned to pixel location ($I_c$, $J_c$) in the third image 503 would also, by necessity, already include the voltage drop attributable to the second scan 502, which, as indicated, includes voltage drops attributable to the first scan 501. Finally, the voltage level assigned to pixel location ($I_d$, $J_d$) in the fourth image 504 would also, by necessity, already include the voltage drop attributable to the first scanned image 501 and the second scanned image 502.

Accordingly, the change attributable solely to the capture of the second image 502 needs to be calculated in order to accurately determine the actual voltage dropped when the second image 502 was scanned, the change attributable to solely to the capture of the third image 503 needs to be calculated in order to accurately determine the actual voltage dropped when the third image 503 was scanned, and the change attributable solely to the capture of the fourth image 504 needs to be calculated in order to accurately determine the actual voltage dropped when the fourth image 504 was scanned.

In order to accomplish this, the voltage drop from the prior scan is subtracted out from the voltage drop for the current scan. Accordingly, the voltage level for each pixel location in the first image 501 is subtracted from the voltage level for each corresponding pixel location in the subsequently scanned image, in this case the second image 502. Accordingly, the +2.5 Volts which represents the voltage of pixel 310b in the second image 502 includes the +1.5 Volts which was actually dropped at pixel 310a when scanning the first image 501. Therefore, +1.5 Volts is subtracted from the +2.5 Volts in order to find the actual voltage drop attributable to the scan of the second image 502 alone. In this case, the voltage of pixel location ($I_b$, $J_b$) in the second scan has dropped a total of 1.0 Volt from the time between the first scan and the second scan. Similarly, the +4.5 Volts which represents the voltage of pixel 310c in the third image 503 includes the +2.5 Volts from pixel 310b in the second image 502. Therefore, +2.5 Volts is subtracted from the +4.5 Volts in order to find the actual voltage drop attributable to the scan of the third image 503 alone. Accordingly, in this case the voltage of pixel location ($I_c$, $J_c$) in the third image 503 drops to a total of +2.0 Volts, which accurately reflects the drop in voltage attributable to the third scan alone.

It is understood that in a preferred embodiment of the present invention, four images are actually scanned over a single cycle and, accordingly, digital pixel data from the third scanned image 503 will also have to be subtracted out from the digital pixel data for the fourth scanned image in order to accurately show the actual voltage drop attributable to the fourth scan. Therefore, +4.5 Volts is subtracted from the +5.0 Volts in order to find the actual voltage drop attributable to the scan of the fourth image 504 alone. Accordingly, in this case, the voltage of pixel location ($I_d$, $J_d$) in the fourth image drops a total of 0.5 Volts which accurately reflects the drop in voltage attributable to the fourth scan alone.

Once this has been done for each pixel location in the second image 502, we have revised digital pixel data for the second image 502 which actually now only contains voltage drop information attributable to the scan of the second image, plus any drops which may have occurred during the time between the scan of the first image 501 and the scan of the second image 502. Similarly, we have revised digital pixel data for the third image 503 which actually now only contains voltage drop information attributable to the scan of the third image, plus any drops which may have occurred during the time between the scan of the second image 502 and the scan of the third image 503. In a preferred embodiment, we would also have revised digital pixel data for a fourth image 503 which would actually now only contain voltage drop information attributable to the scan of the fourth image, plus any drops which may have occurred during the time between the scan of the third image 503 and the scan of the fourth image.

In order to compensate for any voltage drops which may have been attributable to the lapse of time between scans (i.e. the time between the scan of the first image 501 and the scan of the second image 502, the time between the scan of the second image 502 and the third image 503, or the time between the scan of the third image 503 and the fourth image 504), the revised digital pixel data for each pixel location in each image is further multiplied by some fractional weight factor which is related to the time between scans. Preferably, the fractional weight factor is inversely related to the time multiple between scans such that if the first image 501 was scanned at a time of 1ms and the second image 502 was scanned at a time of 2 ms, then the information obtained in the second scan 502 would preferably be multiplied by a fractional number of 0.5 (1ms/2/ ms) to compensate for voltage drops which may have occurred between the time of 1 ms and the time of 2 ms, assuming a constant voltage drop occurs between scans. Likewise, if the third image 503 was scanned at a time of 4 ms, then the information obtained in the third scan 503 would preferably be multiplied by a fractional number of 0.25 (1 ms/4 ms) to compensate for voltage drops which may have occurred between the time of 1 ms and the time of 4 ms, assuming a constant voltage drops between scans.

Referring once again to our example, the voltage at the pixel location ($I_b$, $J_b$) has dropped a total of 1.0 Volt as a result of the second scan 502, and this voltage drop includes the small drop which may be attributable to the lapse of time between the second scan 502 and the first scan 501. Accordingly, this number would be multiplied by some fractional number, preferably 0.5, in order to subtract out or account for the normal voltage drop attributable to leakage of the capacitor in the capture cell during this lapse of time. Therefore, the final voltage value of (0.5 Volts) associated with pixel location ($I_b$, $J_b$) now reflects only that drop actually attributable to the scan of the second image 502. Likewise, the voltage at the pixel location ($I_c$, $J_c$) has dropped a total of 2.0 Volt between the time of the third scan 503 and the second scan 502. This number would be multiplied by a fractional number, preferably 0.25, in order to account for the normal voltage drop attributable to leakage of the capacitor in the capture cell. Therefore, the final voltage value of (0.5 Volts) associated with pixel location ($I_c$, $J_c$) now reflects only that drop actually attributable to the scan of the third image 503. Preferably this is repeated for each pixel location in each of the scanned images with revised digital pixel data which accurately reflects actual voltage drops attributable to each scan have been calculated. This is preferably performed by a processor when executing the digital pixel data adjustment module 312.

Calculation of Translational Vectors

Figure 6:
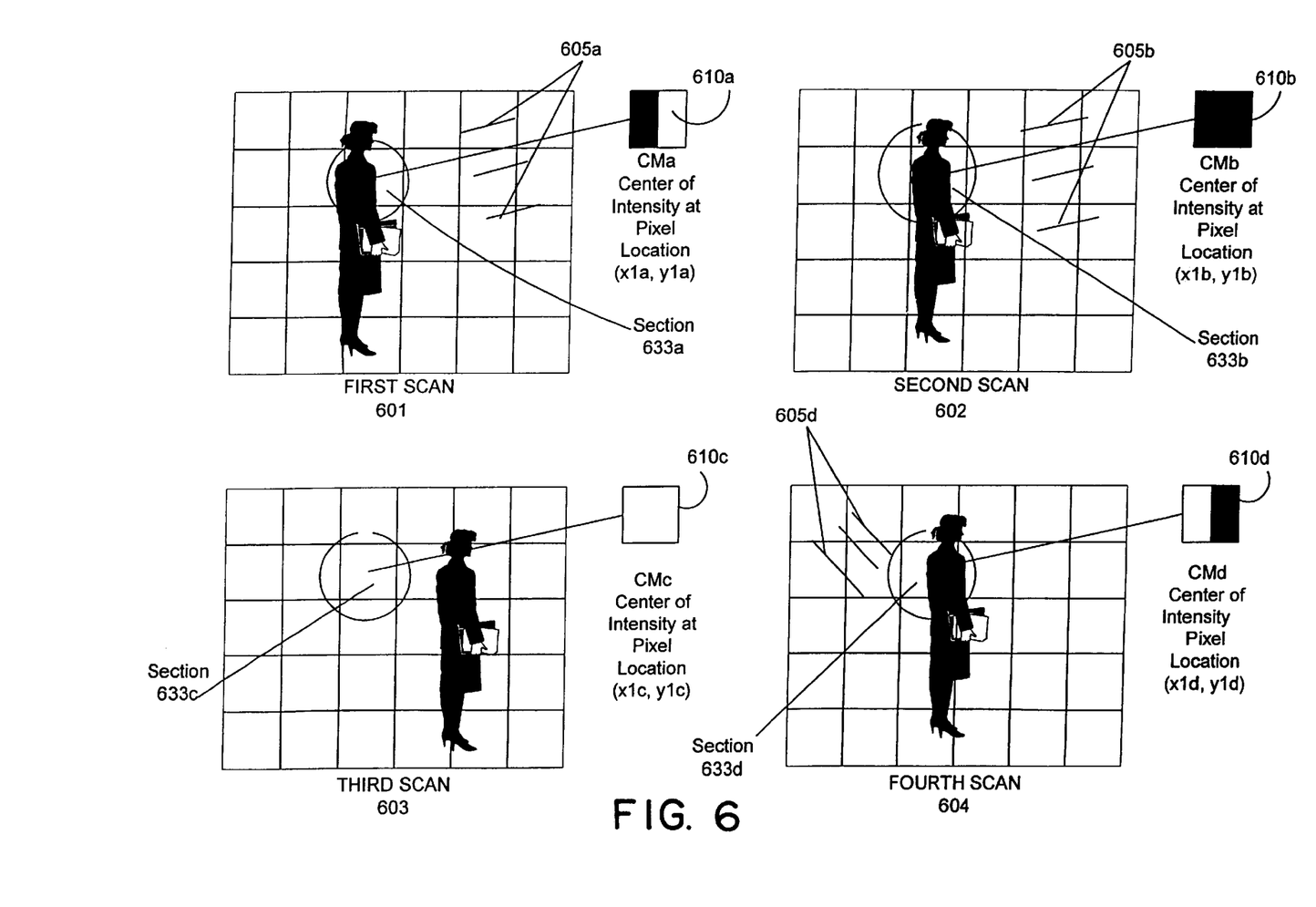
FIG. 6 illustrates the concept of calculating the location of centroids or centers of intensity for four consecutively scanned images, calculating translational vectors between the centroids or centers of mass in each subsequently scanned image and realigning the digital pixel data for each subsequent scan in order to reduce motion artifacts which may have occurred between each scan in accordance with a preferred embodiment of the present invention.

FIG. 6 illustrates four different scans of an image, wherein each of the scans has been taken consecutively. Each scan shown in FIG. 6 further illustrates a number of lines 605a–d. It is understood these lines indicate the direction of light from a light source used to illuminate the image and are not actually visible in the scanned image. However, they do affect the intensity and appearance of the overall image. As shown in FIG. 4, the figure has changed locations between the first and second consecutive scans 601 and 602 and the lines 605a and 605b indicate that light travels in the same direction from the light source in each of the first and second consecutive scans 601 and 602. The figure has also changed location in the third scan 603, although the lines 605c still indicate that light continues to travel from the same direction. Finally, the figure has once again moved in the fourth scan 604 and is now centrally located. However, as indicated by lines 605d, the light source has changed location and is now behind the object. This change in location of the light source effects the appearance of the image.

As shown in FIG. 6, each of the scanned images is preferably divided into a number of sections, as shown by the solid lines dividing each of the scanned images into a matrix of sections arranged in rows and columns. The present invention calculates a centroid or center of intensity for each of these sections in each of the scanned images. The centroid or center of intensity is the central location of brightness relative to the brightness levels throughout the entire section—i.e., the brightness levels for each pixel in the section are calculated and the centroid or center of intensity relative thereto is then appropriately determined. This is done for each of the sections in each of the scanned images. Alternatively, a single centroid or center or intensity for each scanned image may be calculated using the digital pixel data from all of the sections in each scanned image.

FIG. 6 shows a centroid or center of intensity CMa for section 633a in the first scanned image 601 located at a point X1a, Y1a. FIG. 6 further shows a centroid or center of intensity CMb for section 633b in the second scanned image 602 located at another point X1b, Y1b—where X1a is not equal to X1*b* and Y1*a* is not equal to Y1*b*. Additionally, as is shown in FIG. 6, the centroid or center of intensity CMc for section 633*c* in the third scanned image 603 is also located at a completely different point X1*c*, Y1*c*; and, finally, the centroid or center of intensity CMd for section 633*d* in the fourth scanned image 604 is located at a fourth point X1*d*, Y1*d* which is different from the location of the centroid or center of intensity CMc for section 633*c* in the third scanned image 603, or the centroids or centers of intensity CMa and CMb for sections 633*a* and 633*b* in the first and second scanned images 601 and 602. The scanned images 601–604 in FIG. 6 only show the centers of intensity for the sections 633*a*–633*d*. It is understood that in a preferred embodiment of the present invention, a centroid or center of intensity is calculated for each of the sections in each of the scanned images 601–604.

After the centroids or centers of intensity for each of the sections in each of the scanned images 601–604 have been calculated, translation matrices are then calculated for each of the sections. These translation matrices contain translational vectors which represent differences in locations between the centroids centers of intensity for each of the images scanned when comparing the location of a centroid or center of intensity for an initially scanned image with the location of the centroid or center of intensity for a next scanned image. The size of the translation matrices will depend upon the number of sections each scanned image is divided into, with each entry in the translation matrix containing a translational vector representing an integer difference in horizontal and vertical pixel locations between the centroids or centers of intensity for each of the sections in the scans 601–604.

In each of the scans indicated in FIG. 6, there are thirty sections, so the translation matrices will each have thirty translational vector entries. Preferably one translation matrix will be calculated for the differences in locations of centroids or centers of intensity between each image and first or best image. It is understood that each image may be divided into a greater or lesser number of sections, such that the number of translational vectors calculated may vary. As the number of sections is increased, the system requires more time and resources to calculate and store the translational vectors but the system is able to more accurately compensate for motion artifacts between scanned images. As the number of sections decreases, the system may operate faster and require fewer resources; however, the accuracy in fully compensating for and reducing motion artifacts between images is reduced.

As indicated earlier, it is assumed for purposes of this specification that the first scanned image represents the "best" image and that motion artifacts are present in each subsequent image. Accordingly, translation matrices are calculated for the differences in locations of centers of intensity between the first or "best" scan 601 and the second scan 602, differences in locations of centers of intensity between the first or "best" scan 601 and the third scan 602, and differences in location of centers of intensity between the first or "best" scan 601 and the fourth scan 604. Accordingly, there will be three different translation matrices calculated for the scans illustrated in FIG. 6. If the first scan is not the best scan, then translational matrices may be calculated between any of the other scans considered to be the "best" scan and each subsequent scan.

Each of the translational vectors in these translational matrices are then examined carefully for any significant anomalies. For example, if the differences between centroids or centers of intensity between any sections in subsequent scans exceeds a predetermined threshold or upper limiting vector (i.e., if the translational vector is too large), it is likely there was a substantial camera movement, substantial movement of the object, or a significant change in lighting between the two scans. Accordingly, this indicates a significant anomaly. If any significant anomalies exist between subsequent scans, then the appropriate image, that image which is significantly different, is discarded.

After the translation matrices have been calculated between each of the sections in subsequent scans and any significant anomalies have been detected and the appropriate scan removed, the digital pixel data in each subsequent image is adjusted using the information in the translation matrices. Each pixel in a first section of the second scan 602 will be adjusted by the translational vector calculated for the first section between the second scan 602 and the first scan 601. In other words, each pixel in the first section of the second scan 602 will be adjusted an integer number of horizontal and vertical pixel locations in accordance with the translational vector calculated. This is repeated for all of the sections in the second scanned image 602.

For example, as indicated earlier, the centroid or center of intensity for section 633*a* in the first scanned image 601 is located at position X1*a* and Y1*a*, while the centroid or center of intensity for the corresponding section 633*b* in the second scanned image 602 is located at position X1*b* and Y1*b*. Accordingly, the vector difference between sections 633*b* and 633*a* in the second and first scanned images 602 and 601, would be represented by the (X1*b*–X1*a*, Y1*b*–Y1*a*). Accordingly, each of the pixels in section 633*b* of the second scan 602 needs to be relocated or adjusted by this vector.

Additionally, as explained earlier, the centroid or center of intensity for section 633*c* in the third scan 603 is located in a different position than the centroid or center of intensity for the corresponding section 633*b* in the first scan 601. Accordingly, each pixel in section 633*c* needs to be adjusted. The centroid or center of mass for section 633*a* in the first scanned image 601 is located at (X1*a*, Y1*a*), while the centroid or center of intensity for section 633*c* in the third scanned image 603 is located at (X1*c*, Y1*c*). Accordingly, the translational matrix for the differences in centroids or centers of intensity locations between the third and first scanned images 603 and 601, will have a translational vector entry equal to (X1*c*–X1*a*, Y1*c*–Y1*a*). Accordingly, each pixel in section 633*c* of the third scanned image 603 must be adjusted by this translational vector.

The process of adjusting the location of each pixel in each of the sections by the calculated translation matrix is repeated for each scanned image. Accordingly, when the process is complete, the second scanned image 602 has been adjusted, as necessary, into a new second image with each pixel in the image adjusted in accordance with the contents of the translational matrix calculated between the first and second scanned images. Likewise, the third scanned image 603 has been adjusted, as necessary, into a new third image with each pixel in the image adjusted in accordance with the contents of the translational matrix calculated between the first and third scanned images. Additionally, the fourth scanned image 604 has been adjusted, as necessary, into a new fourth image with each pixel in the image adjusted in accordance with the contents of the translational matrix calculated between the first and the fourth scanned images.

The final step in the process is to combine the new digital pixel data from each of the subsequently scanned images (after it has been realigned using the translational matrices) with the digital pixel data from the first of "best" image. This can be done by directly adding the voltages from each corresponding pixel location or by using any appropriate weighted summing technique known in the art. Once all of the digital pixel data from each of the scanned images has been combined a final image is generated. The final image will represent a significantly improved image with any motion artifacts reduced.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for reducing motion artifacts between a first scan of an image and a second scan of an image in order to generate a final image, the method comprising:
   a) storing digital pixel data for the first scan and the second scan;
   b) using the first scan and the second scan to generate a translational second scan having new digital pixel data which compensates for motion artifacts between the first scan and the second scan; and
   c) combining the digital pixel data of the first scan with the new digital pixel data of the translational second scan in order to generate the final image;
   wherein the new digital pixel data of the translational second scan is weighted before it is summed with the digital pixel data of the first scan.

2. The method of claim 1, wherein the step of generating the translational second scan comprises:
   a) calculating a translational vector for the second scan; and
   b) adjusting the second scan by realigning each pixel position in the second scan by a distance equal to the length of the translational vector, thereby generating a translational second scan having new digital pixel data which compensates for motion artifacts between the first scan and the second scan.

3. The method of claim 2, wherein the step of calculating a translational vector for the second scan comprises:
   a) identifying a first pixel position for a centroid in the first scan;
   b) identifying a second pixel position for a centroid in the second scan; and
   c) determining a difference in number of horizontal and vertical pixel positions between the first pixel position and the second pixel position.

4. The method of claim 1, wherein the step of generating the translational second scan comprises:
   a) dividing the first scan into a number of sections and the second scan into an equal number of corresponding sections;
   b) calculating a translational vector for each corresponding section in the second scan; and
   c) adjusting the second scan by realigning each pixel position in the second scan by a distance equal to the translational vector calculated for that corresponding section, thereby generating a translational second scan having new digital pixel data which compensates for motion artifacts between the first scan and the second scan.

5. The method of claim 4, wherein the step of calculating a translational vector for each corresponding section in the second scan comprises:
   a) identifying a first set of pixel positions for centroids in each of the sections of the first scan;
   b) identifying a second set of pixel positions for centroids in each of the corresponding sections in the second scan; and
   c) determining a difference in pixel position between the pixel positions of the centroids for each section in the first scan and the pixel positions of the centroids for each corresponding section in the second scan.

6. The method of claim 4, wherein each translational vector includes a number of horizontal and vertical pixel locations representing an integral difference in pixel position between the pixel position of a centroid in a section in the first scan and the pixel position of a centroid for a corresponding section in the second scan.

7. The method of claim 1, wherein the step of combining is comprised of:
   a) dividing both the first scan and translational second scan into a plurality of equal number of sections, wherein each section contains an equal number of pixel positions, with each pixel position having an associated voltage level which represents a change in voltage from a reference voltage at a point in time when the first or second scan was captured; and
   b) summing the associated voltage level for each pixel position in the first scan with the associated voltage level for each pixel position in the translational second scan, thereby generating a final image.

8. The method of claim 7, wherein the associated voltage level for each pixel position in the translational second scan is weighted before it is summed with the associated voltage level for each pixel position in the first scan.

9. The method of claim 8 wherein the associated voltage level for each pixel position in the translational second scan is weighted by multiplying the associated voltage level by a factor which is related to the point in time when the second scan was captured in order to compensate for changes in the associated voltage level attributable to a lapse in time between the point in time when the first scan was captured and the point in time where the second scan was captured.

10. A method for reducing motion artifacts between a first scan of an image and a second scan of an image before generating a final image, the method comprising:
    a) dividing the first scan into a number of sections and the second scan into an equal number of corresponding sections, wherein each section and corresponding section contains an equal number of pixel positions, with each pixel position having an associated voltage level which represents a change in voltage from a reference voltage at the time the first and second scans were each captured; and
    b) subtracting out the associated voltage level for each pixel position in the first scan from the associated voltage level for each corresponding pixel position in the second scan, thereby creating a revised second scan with each pixel position in the revised second scan having an associated voltage level which represents a change in voltage from the voltage level of the same pixel position in the first scan at the time the second scan was captured.

11. The method of claim 10 further comprising:
    c) summing the associated voltage level for each pixel position in the first scan with the associated voltage level for each corresponding pixel position in the revised second scan, thereby generating the final image.

12. The method of claim 11, wherein the associated voltage level for each pixel position in the revised second scan is weighted before it is summed with the associated voltage level for each pixel position in the first scan.

13. The method of claim 10 further comprising:
    c) generating a translational second scan using the associated voltage level for each corresponding pixel position in the revised second scan, wherein said translational second scan further compensates for motion artifacts between the first scan and the revised second scan; and
    d) combining the first scan with the translational second scan in order to generate the final image.

14. The method of claim 13, wherein the step of generating a translational second scan comprises:
   a) identifying a pixel position of a centroid for each of the sections in the first scan;
   b) identifying a pixel position of a corresponding centroid for each of the corresponding sections in the revised second scan;
   c) calculating translational vectors between the centroids for each section in the first scan and the corresponding centroids for each section in the revised second scan; and
   d) using the translational vectors to adjust the position of each pixel in each corresponding section of the revised second scan, thereby generating a translational second scan.

15. The method of claim 14, wherein translational vectors are calculated by:
   a) determining an integral number of horizontal and vertical pixel locations between the centroid for each section in the first scan image and the corresponding centroid for each corresponding section in the revised second scan; and
   b) repeating this process for each section such that a translational vector is calculated between the centroids for each section in the first scan and the corresponding centroids for each corresponding section in the revised second scan.

16. The method of claim 15, wherein the translational vectors are used to adjust the position of each pixel in each corresponding section of the revised second scan by relocating each pixel in a corresponding section by a distance equal to the integral number of horizontal and vertical pixel locations determined to be between the centroid of the section in the first scan and the corresponding centroid of the corresponding section in the revised second scan.

17. The method of claim 13 wherein the first scan and the translational second scan are combined in order to generate the final image by summing the associated voltage level for each pixel position in the first scan with the associated voltage level for each corresponding pixel position in the translational second scan.

18. The method of claim 17, wherein the associated voltage level for each corresponding pixel position in the translational second scan is weighted before it is summed with the associated voltage level for each pixel position in the first scan.

19. A computer program product comprising:
   a computer usable medium having computer readable code embodied therein for reducing motion artifacts between a first scan of an image having a number of pixels and a second scan of an image having the same number of pixels, before combining both scans in order to generate a final image, the computer readable code executable by a processor and comprising:
   a) a translational vector generating module for generating a translational second scan, which compensates for motion artifacts between the first scan and the second scan; and
   b) a summing module for combining the first scan with the translational second scan, thereby generating the final image;
   wherein digital pixel data of the translational second scan is weighted before it is summed with digital pixel data of the first scan.

20. The computer program product of claim 19, wherein the translational vector generating module causes the processor to:
   a) identify a first pixel position of a centroid for the first scan;
   b) identify a second pixel position of a centroid for the second scan;
   c) calculate a difference in horizontal and vertical pixel positions between the first pixel position of the centroid in the first scan and the second pixel position of the centroid of the second scan; and
   d) adjust the pixels in the second scan by relocating each pixel a distance equal to the difference in horizontal and vertical pixel positions, thereby generating the translational second scan.

21. The computer program product of claim 20, wherein the summing module causes the processor to generate the final image by summing voltage levels associated with each pixel in the first scan with voltage levels associated with each adjusted pixel in the translational second scan.

22. The computer program product of claim 21, wherein voltage levels associated with each adjusted pixel in the translational second scan are all weighted before they are summed with voltage levels associated with each pixel in the first scan.

23. The computer program product of claim 19, wherein the translational vector generating module causes the processor to:
   a) divide the first scan into a number of sections and the second scan into an equal number of corresponding sections, wherein each section in the equal number of sections contains a plurality of total pixels;
   b) identify a pixel position of a centroid for each of the equal number of sections in both the first scan and the second scan;
   c) calculate a difference in horizontal and vertical pixel positions between the centroid of each section in the first scan image and the centroid of each corresponding section in second scan; and
   d) adjust the plurality of total pixels in each of the sections in the second scan by relocating each pixel a distance equal to the difference in horizontal and vertical pixel positions calculated for that section.

24. The computer program product of claim 23, wherein the summing module causes the processor to:
   a) divide the first scan and translational second scan into a plurality of equal number of sections, wherein each section contains an equal number of pixel positions, with each pixel position having an associated voltage level which represents a change in voltage from a reference voltage; and
   b) generate the final image by summing the associated voltage level for each pixel position in the first scan with the associated voltage level for each corresponding pixel position in the translational second scan.

25. A computer program product comprising:
   a computer usable medium having computer readable code embodied therein for reducing motion artifacts between a first scan of an image and a second scan of an image before combining both scans in order to generate a final image, the computer readable code comprising:
   a voltage compensation module for:
   i) dividing both the first scan and the second scan into an equal number of sections, wherein each section contains an equal number of pixel positions, with each pixel position having an associated voltage level which represents a change in voltage from a reference voltage; and
   ii) subtracting out the associated voltage level for each pixel position in the first scan from the associated voltage level for each corresponding pixel position in the second scan, thereby creating a new second scan with each pixel position in the new second scan having an associated voltage level which represents a change in voltage from the first scan.

26. The computer program product of claim 25, wherein the computer readable code further comprises:

a translational vector generation module for identifying a pixel position of a centroid for each of the equal number of sections in both the first scan and the new second scan and generating a translational second scan which compensates for motion artifacts between the first scan and the new second scan; and a summing module for generating the final image.

27. The computer program product of claim 26, wherein the translational vector generating module:

calculates a difference in the pixel position between the centroid of each section in the first scan image and the centroid of each section in the new second scan; and adjusts the plurality of total pixels in each of the sections in the new second scan by relocating each pixel a distance equal to the difference in pixel position calculated for that section.

28. The computer program product of claim 26, wherein the summing module:

adds the associated voltage level for each pixel position in the first scan with the associated voltage level for each pixel position in the translational second scan in order to generate new voltage levels for each pixel position in the final image.

29. An apparatus for reducing motion artifacts between a first scan of an image having a number of pixels and a second scan of an image having the same number of pixels, before combining both scans in order to generate a final image, the apparatus comprising:

a) a translational vector generating module for generating a translational second scan, which compensates for motion artifacts between the first scan and the second scan; and b) a summing module for combining the first scan with the translational second scan, thereby generating the final image.

30. The apparatus of claim 29, wherein the translational vector generating module:

a) identifies a first pixel position of a centroid for the first scan;

b) identifies a second pixel position of a centroid for the second scan;

c) calculates a difference in horizontal and vertical pixel positions between the first pixel position of the centroid in the first scan and the second pixel position of the centroid of the second scan; and d) adjusts the pixels in the second scan by relocating each pixel a distance equal to the difference in horizontal and vertical pixel positions, thereby generating the translational second scan.

31. The apparatus of claim 30, wherein the summing module generates the final image by summing voltage levels associated with each pixel in the first scan with voltage levels associated with each adjusted pixel in the translational second scan.

32. The apparatus of claim 31, wherein voltage levels associated with each adjusted pixel in the translational second scan are all weighted before they are summed with voltage levels associated with each pixel in the first scan.

33. The apparatus of claim 29, wherein the translational vector generating module:

a) divides the first scan into a number of sections and the second scan into an equal number of corresponding sections, wherein each section in the equal number of sections contains a plurality of total pixels;

b) identifies a pixel position of a centroid for each of the equal number of sections in both the first scan and the second scan;

c) calculates a difference in horizontal and vertical pixel positions between the centroid of each section in the first scan image and the centroid of each corresponding section in second scan; and d) adjusts the plurality of total pixels in each of the sections in the second scan by relocating each pixel a distance equal to the difference in horizontal and vertical pixel positions calculated for that section.

34. The apparatus of claim 33, wherein the summing module:

a) divides the first scan and translational second scan into a plurality of equal number of sections, wherein each section contains an equal number of pixel positions, with each pixel position having an associated voltage level which represents a change in voltage from a reference voltage; and b) generates the final image by summing the associated voltage level for each pixel position in the first scan with the associated voltage level for each corresponding pixel position in the translational second scan.

35. An apparatus for reducing motion artifacts between a first scan of an image and a second scan of an image before combining both scans in order to generate a final image, the apparatus comprising:

a voltage compensation module for:

i) dividing both the first scan and the second scan into an equal number of sections, wherein each section contains an equal number of pixel positions, with each pixel position having an associated voltage level which represents a change in voltage from a reference voltage; and ii) subtracting out the associated voltage level for each pixel position in the first scan from the associated voltage level for each corresponding pixel position in the second scan, thereby creating a new second scan with each pixel position in the new second scan having an associated voltage level which represents a change in voltage from the first scan.

36. The apparatus of claim 35, further comprising:

a translational vector generation module for identifying a pixel position of a centroid for each of the equal number of sections in both the first scan and the new second scan and generating a translational second scan which compensates for motion artifacts between the first scan and the new second scan; and a summing module for generating the final image.

37. The apparatus of claim 36, wherein the translational vector generating module:

calculates a difference in the pixel position between the centroid of each section in the first scan image and the centroid of each section in the new second scan; and adjusts the plurality of total pixels in each of the sections in the new second scan by relocating each pixel a distance equal to the difference in pixel position calculated for that section.

38. The apparatus of claim 36, wherein the summing module adds the associated voltage level for each pixel position in the first scan with the associated voltage level for each pixel position in the translational second scan in order to generate new voltage levels for each pixel position in the final image.

* * * * *

UNITED STATES PATENT AND TRADEMARK OFFICE
CERTIFICATE OF CORRECTION

PATENT NO.    : 6,457,306 B1                                    Page 1 of 1
DATED         : October 1, 2002
INVENTOR(S)   : Abel et al.

It is certified that error appears in the above-identified patent and that said Letters Patent is hereby corrected as shown below:

Column 10,
Line 9, after the word "source", delete the ".";
Line 46, delete "Earth ;" and insert therefor "Earth:";
Line 60, delete the first occurrence of "said".

Signed and Sealed this

Twenty-eighth Day of January, 2003

JAMES E. ROGAN
*Director of the United States Patent and Trademark Office*